United States Patent [19]
Field

[11] Patent Number: 5,358,766
[45] Date of Patent: Oct. 25, 1994

[54] MAT

[76] Inventor: Stephen J. Field, 61 Bellvue Crescent, Cliftonwood, Bristol BS8 4FT, England

[21] Appl. No.: 38,358

[22] Filed: Mar. 26, 1993

[30] Foreign Application Priority Data

Mar. 26, 1992 [GB] United Kingdom ............... 9206647
Feb. 19, 1993 [GB] United Kingdom ............... 9303388

[51] Int. Cl.$^5$ ................................................ C09J 7/02
[52] U.S. Cl. ....................................... 428/77; 428/261; 428/343; 428/354
[58] Field of Search ................. 428/343, 354, 261, 77

[56] References Cited

U.S. PATENT DOCUMENTS

| | | | |
|---|---|---|---|
| 2,800,215 | 7/1957 | Converse | 428/40 |
| 4,013,400 | 3/1977 | Thettu et al. | 432/75 |
| 4,713,274 | 12/1987 | Minor | 428/40 |
| 4,760,618 | 8/1988 | Chapin | 15/104.93 |
| 4,799,054 | 1/1989 | House | 340/710 |
| 5,153,254 | 10/1992 | Chen | 524/505 |
| 5,217,781 | 6/1993 | Kuipers | 428/85 |

FOREIGN PATENT DOCUMENTS 1475366 6/1977 United Kingdom .
1586541 3/1981 United Kingdom .

*Primary Examiner*—Jenna L. Davis
*Attorney, Agent, or Firm*—Hopkins & Thomas

[57] ABSTRACT

This invention relates to a mat having a major surface providing an operational surface for a device incorporating a rolling ball or roller such as a computer mouse, in which at least a portion of the mat is tacky whereby the ball or roller can be cleaned by passing the ball or roller over that portion.

27 Claims, 3 Drawing Sheets

MAT

This invention relates to a mat and is particularly though not exclusively concerned with a mat for use with a "mouse" connected to a computer, i.e. a device comprising a rolling ball, or other rollable element, and means for determining the position of the device by detecting movement of the ball, or other rollable element. The mouse is connected to the computer for example by a cable or an infra red link.

In use, the mouse is moved on a surface, usually that of a desk top, and movement of the mouse leads to movement of a cursor displayed on the computer display screen. Users often experience the problem that the ball of the mouse slips on a shiny surface, particularly a polished desk top, which leads to poor control of the cursor. Mats have been developed which overlay the surface on which the mouse is to be operated. For example, one type of mat is formed from a single-lined expanded neoprene, the mouse being moved on the lined surface of the mat. Another type of mat, which can be arranged to dissipate static electricity, is formed from a vinyl material, the mat having connections for connecting an earth wire.

Another problem experienced by the users of a computer mouse is that the ball collects dirt and fluff from the surface on which it operates which reduces its efficiency.

It is an object of the present invention to overcome or at least mitigate the disadvantages of the prior art.

According to one aspect of the invention there is provided a mat having a major surface providing an operational surface for a device incorporating a rolling ball or roller such as a computer mouse, in which at least a portion of the mat is tacky whereby the ball or roller can be cleaned by passing the ball or roller over that portion. Thus a mat according to this aspect of the invention is advantageous in that dirt or fluff can be removed from the ball or roller which could otherwise affect its operation.

The portion of the mat which is tacky may be made, for example, from highly-plasticized polyvinyl chloride (PVC), a soft polyurethane, material or synthetic rubber, or a silicone rubber, or composites thereof. Where the portion includes highly-plasticized PVC it may be formulated in accordance with a composition disclosed in our earlier British Patent No. 1475366.

Where the operational surface is uppermost in use, it is preferred that the lower major face is tacky or has a higher coefficient of friction than the operational surface to hold the mat in place on the surface on which it is located in use. That surface may be for example a desk or work surface. The more tacky or higher coefficient of friction surface may be provided by a layer of a different material to that defining the operational major surface of the mat.

In a preferred embodiment the operational surface is provided by a fabric sheet overlaying a major portion of the major surface of the mat, the tacky portion being provided by the exposed portion of the mat which is not covered by the fabric material. The fabric may be for example polyester. Preferably, the fabric is static dissipative. For example, the fabric may incorporate a carbon fibre interweave. Where the mat is static dissipative, it may be provided with means for connecting it to earth.

The fabric sheet may be printed on for example with an advertising message.

According to a second aspect of the invention there is provided a mat having a major surface providing an operational surface for a device incorporating a rolling ball or roller such as a computer mouse, the operational surface being tacky whereby the friction between the ball or roller and the operational surface is sufficient to ensure efficient operation of the device. The mat according to the invention is advantageous in that it provides a relatively high friction operational surface which allows good control of the mouse. Advantageously the tacky surface removes dirt or fluff from the ball or roller. The mat may be made, for example, from highly-plasticized polyvinyl chloride (PVC), a soft polyurethane, material or synthetic rubber, or a silicone rubber, or composites thereof. Where the mat includes highly-plasticized PVC it may be formulated in accordance with a composition disclosed in our earlier British Patent No. 1475366.

Preferably, the mat is arranged to have a lower major surface which is more tacky, or has a higher co-efficient of friction than the operational surface whereby movement of the mat in relation to a surface on which it is overlaid is inhibited. The more tacky or higher co-efficient of friction surface may be provided by a layer of a different material to that defining the operational major surface of the mat. Preferably, however, the operational and/or lower surfaces of the mat are adapted whereby their respective tackiness or coefficients of friction can be controlled. For example, the operational and lower surfaces of the mat may have different textures.

In a preferred embodiment according to the second aspect of the invention the lower major surface is smooth and the operational surface defines a series of projections and/or recesses. The projections and/or recesses may be regularly or irregularly disposed on the operational surface. It has been surprisingly found that the tackiness of a highly-plasticized PVC mat can be controlled by altering the density of the projections and/or the recesses which may be about 0.3 m.m. high, and have a diameter of about 0.2 m.m. and are arranged at 0.5 m.m. centres. It has been found that the tackiness or friction of the operational surface can be increased by increasing the size and density of the projections.

In a preferred embodiment according to the second aspect of the invention, the operational surface of the mat has a portion which is substantially more tacky than the remainder of the operational surface. Such a portion may be useful for cleaning the ball or roller.

Mats in accordance with the invention will now be described, by way of example only, with reference to the accompanying drawings FIGS. 1 to 4 in which.

Figure 1:
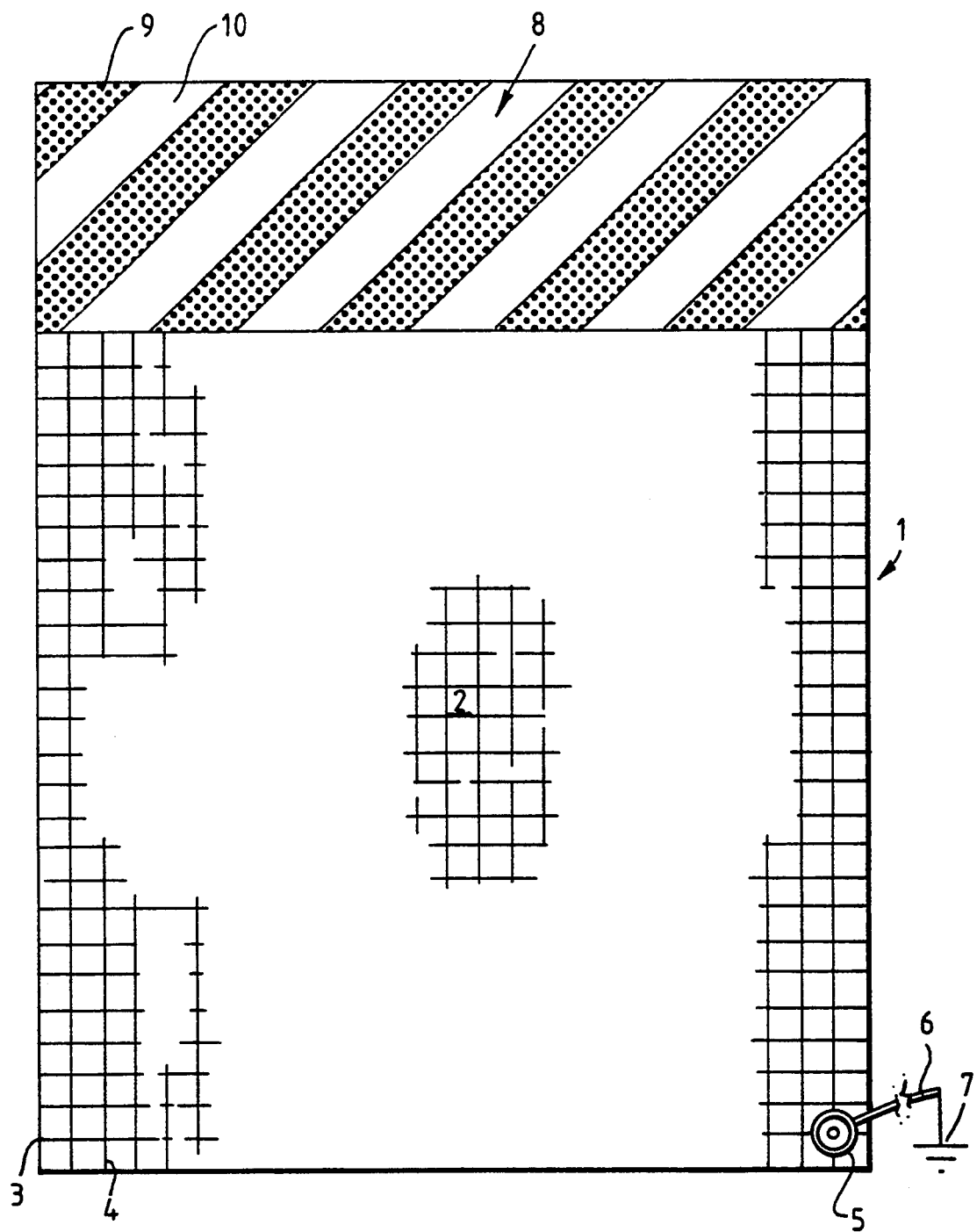
FIG. 1 is a plan view of a mat in accordance with the first aspect of the invention.

The mat 1 shown in FIG. 1 comprises a pad formed from trimellitate-plasticized PVC having bevelled edges.

The major surface 2 which is uppermost in use is partly overlaid by a sheet 3 of woven polyester which incorporates a carbon fibre interweave 4. The sheet 3 provides the operational surface upon which a mouse can be used. A connector 5 which is in electrical connection with the carbon fibre interweave 4 is mounted through one corner of the mat is connected by a lead to an earth connection point 7.

The exposed portion 8 of the PVC pad is tacky and can be used for cleaning the ball or roller of the mouse of fluff or dirt which would otherwise affect its use. The exposed portion 8 includes stippled texture bands, e.g. 9, which are less tacky than adjoining smooth textured bands, e.g. 10, and provide a visually attractive effect.

The lower major surface (obscured) of the mat is provided by the highly-plasticized PVC pad and is also tacky. The tacky nature of the lower surface inhibits movement of the mat over the surface upon which it is placed in use but allows the mat to be moved and does not cause marking of that surface.

The earth connection through the carbon fibre interweave 4, connector 5 and lead 6 renders the mat static dissipative which can be advantageous in certain environments.

Figure 2:
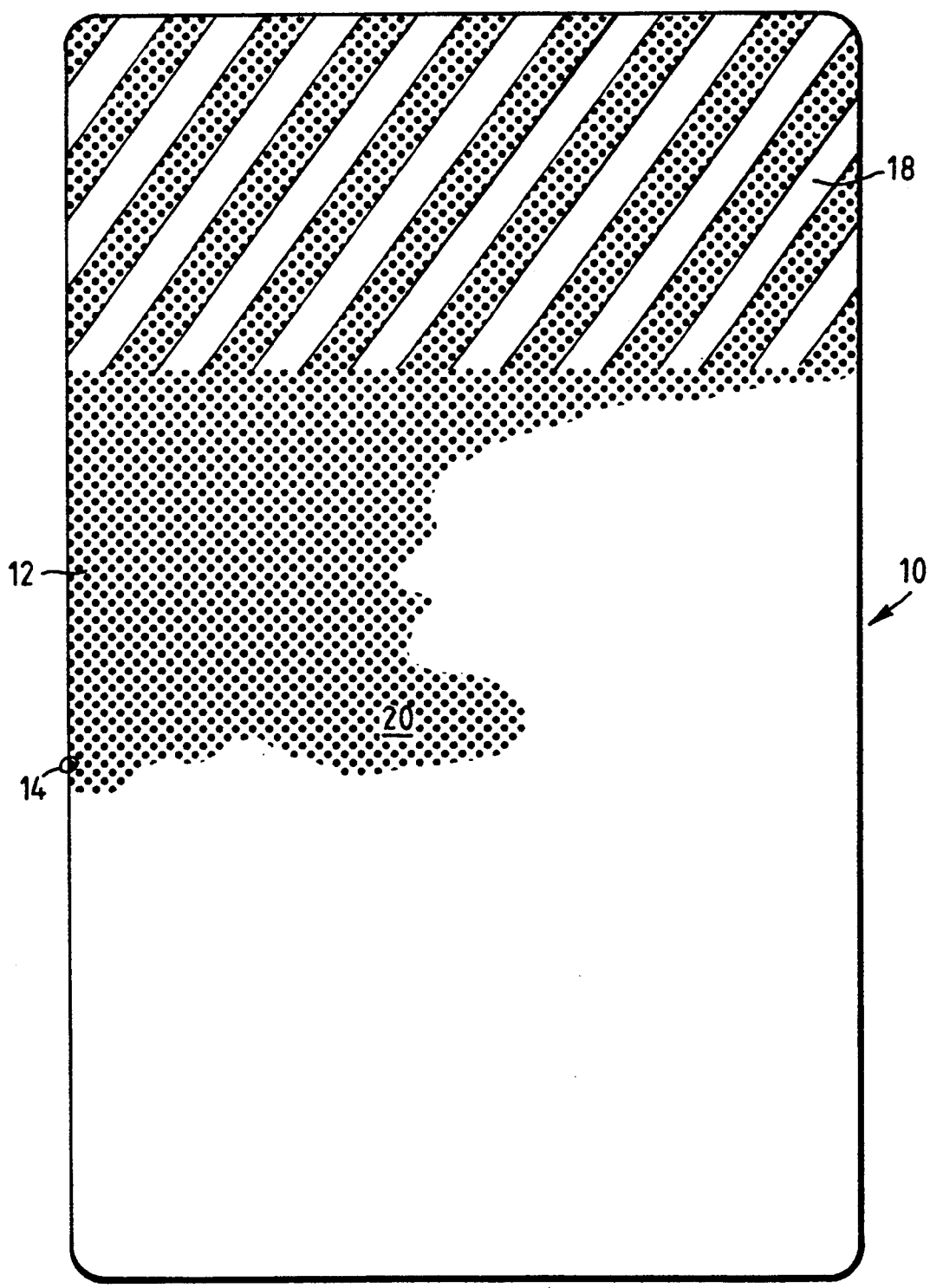
FIG. 2 is a plan view of a mat in accordance with the invention.

The mat 10 shown in FIG. 2 comprises a textured upper surface 12 which constitutes the operational surface. The mat is approximately 25 cm long and 17 cm wide. The mat is formed from trimellitate-plasticized PVC and has a stippled surface texture (only shown as partially extending over the surface for clarity) resulting from an irregular array of projections, e.g. 14 as shown in more detail in FIG. 3. Each projection is about 0.3 m.m. high and has a diameter of about 0.2 m.m. The projections are arranged at approximately 0.5 m.m. centres. The upper surface 12 is relatively tacky which provides sufficient friction for efficient operation of a computer mouse thereon. The lower major surface (obscured) of the mat is smooth and is more tacky than the upper surface 12 and therefore inhibits sliding of the mat when placed on a surface such as that of a desk top.

The upper surface 12 of mat 10 includes a portion in which the stippled texture is interrupted by smooth textured bands, e.g. 18. The smooth textured bands are tackier than the main operational surface 20. The ball or roller of the mouse can be cleaned by rolling it over the bands which attract dirt or fluff.

Figure 3:
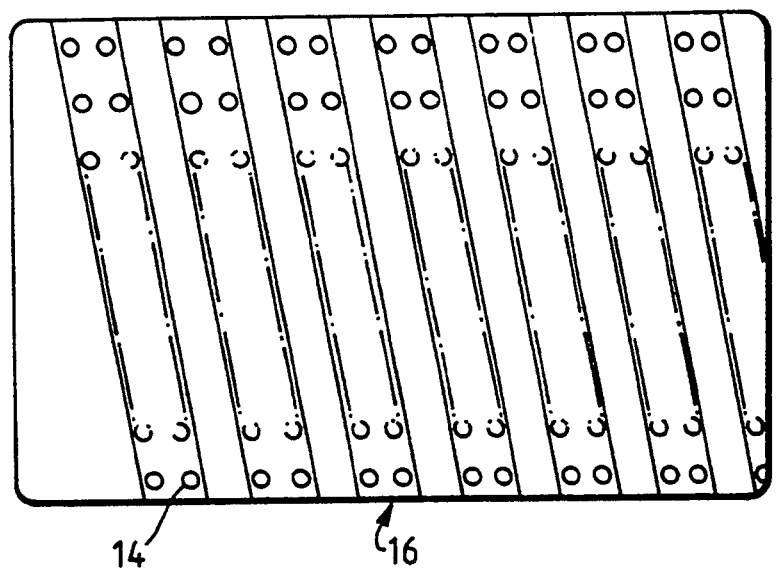
FIG. 3 is an enlarged view of a portion of the operational surface of the mat of FIG. 2.
Figure 4:
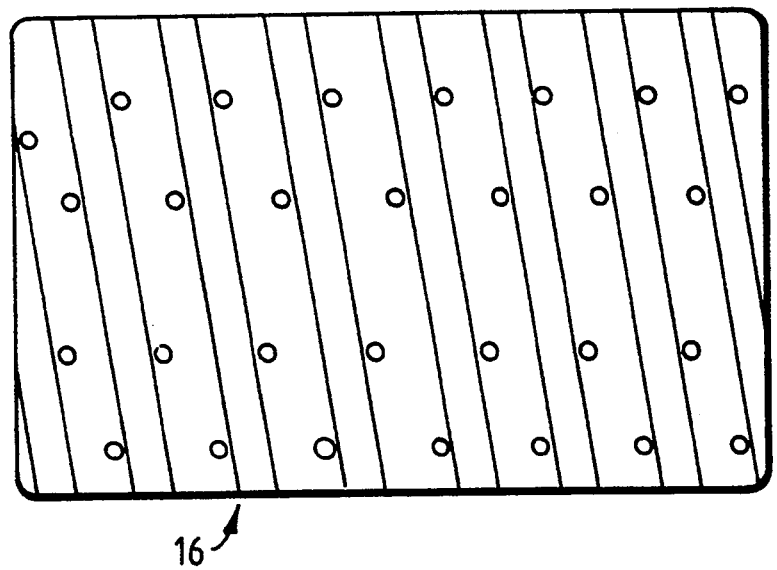
FIG. 4 is another enlarged view of a portion of the operational surface of another mat in accordance with the invention.

The operational surface 16 of the mat shown in FIG. 3 (which has the same composition as mat 10) has a lower density of projections than the surface 12 of FIGS. 2 and 3. Accordingly, the surface 14 is less tacky than the surface 12 of mat 10.

In one embodiment of the invention, the mat may be produced by casting in a metal mould which has previously been shot blasted. The mould produces an array of closely spaced projections and depressions in the surface of the mat which are finer than the projections of mat 10 described above. A mat made in accordance with this embodiment may be preferable in that the surface of the mat is less rough than that of mat 10.

I claim:

1. A computer mouse mat for a device incorporating a rolling ball or roller, such as a computer mouse, comprising: a major surface, having an operational surface and having a ball or roller cleaning surface that is tacky such that the ball or roller of the device can be cleaned by passing the ball or roller over the tacky roller cleaning surface of said major surface, said operation surface being of a different material than said roller cleaning surface.

2. The computer mouse mat of claim 1, wherein the ball or roller cleaning surface of said major surface is made from a material selected from the group consisting of highly-plasticized polyvinyl chloride (PVC), soft polyurethane, synthetic rubber, silicone rubber, and composites thereof.

3. The computer mouse mat of claim 1, wherein said mat is positioned on a surface, and further comprising a lower major surface that is tacky and has a higher coefficient of friction than the coefficient of friction of said operational surface such that said lower major surface holds the mat in place on the surface.

4. The computer mouse mat of claim 2, wherein said mat is positioned on a surface, and further comprising a lower major surface that is tacky and has a higher coefficient of friction than the coefficient of friction of said operational surface such that said lower major surface holds the mat in place on the surface.

5. The computer mouse mat of claim 3, wherein the lower major surface is made from a material that is different than the material from which the operational surface of the mat is made.

6. A computer mouse mat according to claim 4 in which the lower major surface is provided by a layer of a different material to that defining the operational surface of the mat.

7. The computer mouse mat of claim 1, wherein the operational surface is a fabric sheet overlaying a major portion of the major surface of the mat.

8. A computer mouse mat according to claim 2 in which the operational surface is provided by a fabric sheet overlaying a major portion of the major surface of the mat which is uppermost in use.

9. The computer mouse mat of claim 3, wherein the operational surface is a fabric sheet overlaying a major portion of the major surface of the mat.

10. A computer mouse mat according to claim 4 in which the operational surface is provided by a fabric sheet overlaying a major portion of the major surface of the mat which is uppermost in use.

11. A computer mouse mat according to claim 5 in which the operational surface is provided by a fabric sheet overlaying a major portion of the major surface of the mat which is uppermost in use.

12. A computer mouse mat according to claim 6 in which the operational surface is provided by a fabric sheet overlaying a major portion of the major surface of the mat which is uppermost in use.

13. The computer mouse mat of claim 7, wherein the ball or roller cleaning surface of said major surface is an exposed portion of the major surface that is not covered by the fabric material.

14. A computer mouse mat according to claim 8 in which the ball or roller surface is provided by an exposed portion of the major surface which is not covered by the fabric material.

15. The computer mouse mat of claim 9, wherein the ball or roller cleaning surface of said major surface is an exposed portion of the major surface that is not covered by the fabric material.

16. A computer mouse mat according to claim 10 in which the ball or roller cleaning surface is provided by an exposed portion of the major surface which is not covered by the fabric material.

17. A computer mouse mat according to claim 11 in which the ball or roller cleaning surface is provided by an exposed portion of the major surface which is not covered by the fabric material.

18. A computer mouse mat according to claim 12 in which the ball or roller cleaning surface is provided by an exposed portion of the major surface which is not covered by the fabric material.

19. The computer mouse mat of claim 7, wherein the fabric is polyester.

20. The computer mouse mat of claim 1, wherein said mat is static dissipative.

21. The computer mouse mat of claim 7, wherein the fabric is static dissipative.

22. The computer mouse mat of claim 7, wherein the fabric incorporates a carbon fibre interweave.

23. The computer mouse mat of claim 1, further comprising a means for connecting said mat to earth.

24. The computer mouse mat of claim 1, wherein the operational surface is tacky whereby friction between the ball or roller and the operational surface is sufficient to ensure efficient operation of the device.

25. The computer mouse mat of claim 3, wherein the operational and lower surfaces of the mat are adapted whereby their respective tackiness or coefficients of friction can be controlled.

26. The computer mouse mat of claim 3, wherein the operational and lower surfaces of the mat have different textures.

27. The computer mouse mat of claim 3, wherein the lower major surface is smooth and the operational surface defines a series of projections or recesses.

* * * * *